(12) United States Patent
Lee et al.

(10) Patent No.: US 11,423,358 B2
(45) Date of Patent: Aug. 23, 2022

(54) ELECTRIC POWER SOFTWARE DEVELOPMENT PLATFORM

(71) Applicant: KOREA ELECTRIC POWER CORPORATION, Naju-si (KR)

(72) Inventors: Jung-Il Lee, Daejeon (KR); Jun-Sung Kim, Daejeon (KR); Hee-Jeong Park, Daejeon (KR); Ji-Kang Sin, Daejeon (KR); Seung-Hwan Choi, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 756 days.

(21) Appl. No.: 16/315,856

(22) PCT Filed: Jan. 15, 2018

(86) PCT No.: PCT/KR2018/000663
§ 371 (c)(1),
(2) Date: Jan. 7, 2019

(87) PCT Pub. No.: WO2019/083098
PCT Pub. Date: May 2, 2019

(65) Prior Publication Data
US 2021/0342122 A1    Nov. 4, 2021

(30) Foreign Application Priority Data
Oct. 23, 2017    (KR) .................. 10-2017-0137679

(51) Int. Cl.
*G06F 9/44*         (2018.01)
*G06Q 10/10*        (2012.01)
(Continued)

(52) U.S. Cl.
CPC ......... *G06Q 10/101* (2013.01); *G06F 1/3206* (2013.01); *G06F 8/10* (2013.01);
(Continued)

(58) Field of Classification Search
CPC .......... G06F 8/61; G06F 8/10; G06F 11/3093; G06F 1/3206; G06N 20/00; H04W 4/021;
(Continued)

(56) References Cited

U.S. PATENT DOCUMENTS

2010/0332373 A1* 12/2010 Crabtree ................ G06Q 40/04
                                                               705/37
2011/0153368 A1*  6/2011 Pierre .................. G06Q 10/067
                                                               705/4
(Continued)

FOREIGN PATENT DOCUMENTS

JP    2014-534487 A    12/2014
KR    10-2010-0021069 A    2/2010
(Continued)

*Primary Examiner* — Tuan A Vu
(74) *Attorney, Agent, or Firm* — Foundation Law Group, LLP

(57) ABSTRACT

A power software development platform may include a platform adapter configured to provide a connection environment for a plurality of communication devices each installed in a plurality of power facilities, a platform gateway configured to collect data through a plurality of power systems to which the plurality of communication devices are connected, a platform interface which provide a distribution service for the data collected by the platform gateway, a platform data hub configured to receive the data through the distribution service, verify the received data, and provide an access environment for the verified data to an application developer, an analysis abstraction service configured to convert a plurality of physical analysis engines into abstracted services and provide the abstracted services to the application developer, and an application gateway configured to receive an application from the application developer and provide the application to an application user.

7 Claims, 16 Drawing Sheets

(51) Int. Cl.
- *G06N 20/00* (2019.01)
- *G06F 1/3206* (2019.01)
- *G06F 8/10* (2018.01)
- *G06F 8/61* (2018.01)
- *G06Q 10/06* (2012.01)
- *H04W 4/70* (2018.01)
- *H04W 4/021* (2018.01)
- *H04L 12/28* (2006.01)

(52) U.S. Cl.
CPC .............. *G06F 8/61* (2013.01); *G06N 20/00* (2019.01); *G06Q 10/067* (2013.01); *H04L 12/2807* (2013.01); *H04W 4/021* (2013.01); *H04W 4/70* (2018.02)

(58) Field of Classification Search
CPC ............... H04W 4/70; H04L 12/2807; G06Q 10/101; G06Q 10/067; G06Q 40/04
See application file for complete search history.

(56) References Cited

U.S. PATENT DOCUMENTS

| | | | |
|---|---|---|---|
| 2012/0065802 A1* | 3/2012 | Seeber | H04W 4/021 700/295 |
| 2013/0261821 A1* | 10/2013 | Lu | H04L 12/2807 700/289 |
| 2013/0346229 A1* | 12/2013 | Martin | G06F 8/61 705/26.3 |
| 2015/0188789 A1* | 7/2015 | Jayaprakash | G06F 11/3093 709/224 |
| 2016/0358102 A1* | 12/2016 | Bowers | G06N 20/00 |
| 2017/0092055 A1* | 3/2017 | Brockman | G06Q 10/101 |
| 2017/0359832 A1* | 12/2017 | Jacobs | H04W 4/70 |

FOREIGN PATENT DOCUMENTS

| | | |
|---|---|---|
| KR | 10-1255843 B1 | 4/2013 |
| KR | 10-1409528 B1 | 6/2014 |
| KR | 10-2015-0054496 A | 5/2015 |
| WO | WO2013/072925 A2 | 5/2013 |

\* cited by examiner

ELECTRIC POWER SOFTWARE DEVELOPMENT PLATFORM

CROSS REFERENCE TO RELATED PATENT APPLICATION

This application claims the benefit under 35 U.S.C. Section 371, of PCT International Application No. PCT/KR2018/000663, filed on Jan. 15, 2018, which claimed priority to Korean Patent Application No. 10-2017-0137679, filed on Oct. 23, 2017, the disclosures of which are hereby incorporated by the references.

TECHNICAL FIELD

The present invention relates to an electric power software development platform.

BACKGROUND ART

Recently, development platforms and infrastructure required for software development are individually being constructed in various electric power fields, such as power generation, power transmission and transformation, power distribution, and power business.

For this reason, software platform element technologies are being developed in a duplicate manner, and it is difficult to share the technologies. Also, separately constructed information and communications technology (ICT) infrastructure should be maintained as it is at the construction time even if users of a system or the scale of business is reduced. Therefore, the utilization rate of the infrastructure may be lowered, and costs may be increased.

DISCLOSURE

Technical Problem

The present invention is directed to providing a power software development platform in which a plurality of electric power fields are integrated.

Technical Solution

One aspect of the present invention provides a power software development platform including: a platform adapter configured to provide a connection environment for a plurality of communication devices each installed in a plurality of power facilities; a platform gateway configured to collect data through a plurality of power systems to which the plurality of communication devices are connected; a platform interface configured to provide a distribution service for the data collected by the platform gateway; a platform data hub configured to receive the data through the distribution service, verify the received data, and provide an access environment for the verified data to an application developer; an analysis abstraction service configured to convert a plurality of physical analysis engines into abstracted services and provide the abstracted services to the application developer; and an application gateway configured to receive an application from the application developer and provide the application to an application user.

For example, the power software development platform may further include an application back-end service configured to provide an administrator with a management environment for the application provided by the application developer and transfer the application managed in the management environment to the application gateway at a request of the application user.

For example, the application back-end service may further provide a validation environment and a standardization environment for the application provided by the application developer.

For example, the platform gateway may perform security management and validity verification of the collected data.

For example, the plurality of power systems may include at least two of a geographic information system (GIS), a meter data management system, a transformer load management system, a power tunnel monitoring system, a power generation running system, a power quality management system, and a power distribution automation system.

For example, the analysis abstraction service may provide the application developer with a service in which at least two of an estimation model, a statistical analysis model, a numerical analysis model, an optimization model, a machine learning model, a cognitive computing model, an image recognition model, a speech recognition model, and a language recognition model are abstracted.

For example, the power software development platform may further include a GIS platform service configured to provide a subject map based on power map data to the application developer.

For example, the power software development platform may further include a power infographics service configured to provide the application developer with at least two of design item editing, inter-item link management, infographics attribute editor, template management, chart maker, map maker, table maker, data interoperation, and analysis abstraction service-related interfaces.

For example, the power software development platform may further include a power user interface (UI) template service configured to provide the application developer with at least one of web compatibility, common UI, protocol support, and security support functions.

For example, the power software development platform may further include a web human-machine interface (HMI) creation tool service configured to provide a web HMI creation tool to the application developer.

Advantageous Effects

A power software development platform according to an embodiment of the present invention can share, standardize, and manage data and analysis which are commonly used in a plurality of electric power fields, improve data and analysis management efficiency in all the plurality of electric power fields, and enhance security.

A power software development platform according to an embodiment of the present invention can solve problems which affect all of a plurality of electric power fields such as a widespread blackout.

MODES OF THE INVENTION

Figure 1:
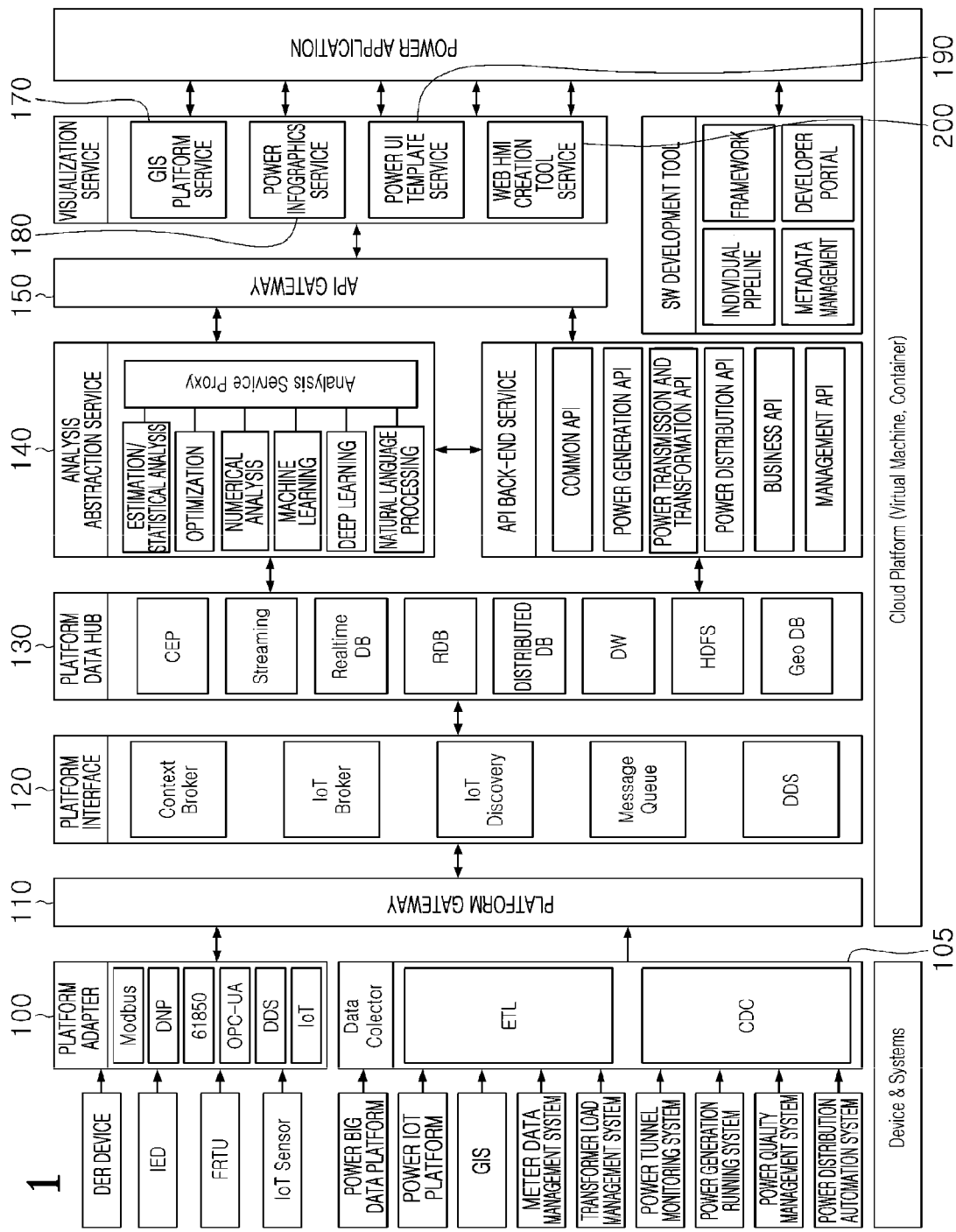
FIG. 1 is a diagram showing a power software development platform according to an embodiment of the present invention.

The following detailed description of the present invention refers to the accompanying drawings that illustrate specific embodiments consistent with the present invention as examples. It should be understood that various embodiments of the present invention differ from each other but do not need to be mutually exclusive. For example, specific shapes, structures, and features disclosed herein for one embodiment may be differently implemented in another embodiment without departing from the spirit and scope of the present invention. In addition, it should be understood that positions or a disposition of individual elements in each disclosed embodiment can be changed without departing from the sprit and scope of the present invention. Therefore, the detailed description given below is not intended to limit the present invention, the scope of which is defined, when properly described, only in the claims and their equivalents. Throughout the drawings, like reference numerals refer to the same or like functions in several aspects.

Hereinafter, embodiments of the present invention will be described in detail with reference to the accompanying drawings so that those of ordinary skill in the art may readily implement the present invention.

FIG. 1 is a diagram showing a power software development platform according to an embodiment of the present invention.

Referring to FIG. 1, a power software development platform according to an embodiment of the present invention may include at least some of a platform adapter 100, a data collector 105, a platform gateway 110, a platform interface 120, a platform data hub 130, an analysis abstraction service 140, an application gateway 150, an application back-end service 160, a power geographic information system (GIS) platform service 170, a power infographics service 180, a power user interface (UI) template service 190, and a power web human-machine interface (HMI) creation tool service 200.

The platform adapter 100 may provide a connection environment for a plurality of communication devices (e.g., a distributed energy resource (DER) device, an intelligent electronic device (IED), a feeder remote terminal unit (FRTU), and an Internet of things (IoT) sensor) each installed in a plurality of power facilities.

The data collector 105 may collect data through a plurality of power systems to which the plurality of communication devices are connected. According to a design, the data collector 105 may be integrated into the platform gateway 110. The plurality of power systems may include at least two of a GIS, a meter data management system, a transformer load management system, a power tunnel monitoring system, a power generation running system, a power quality management system, and a power distribution automation system.

The platform gateway 110 may perform security management and validity verification of the collected data.

The platform interface 120 may provide a distribution service for the data collected by the platform gateway 110.

The platform data hub 130 may receive the data through the distribution service, verify the received data, and provide an application developer with an access environment for the verified data.

The analysis abstraction service 140 may convert a plurality of physical analysis engines into abstracted services and provide the abstracted services to the application developer.

For example, the analysis abstraction service 140 may provide the application developer with a service in which at least two of an estimation model, a statistical analysis model, a numerical analysis model, an optimization model, a machine learning model, a cognitive computing model, an image recognition model, a speech recognition model, and a language recognition model are abstracted.

The application gateway 150 may receive an application from the application developer and provide the application to an application user.

The application back-end service 160 may provide an administrator with a management environment for the application provided by the application developer and transfer the application managed in the management environment to the application gateway 150 at a request of the application user.

Also, the application back-end service 160 may further provide a validation environment and a standardization environment for the application provided by the application developer.

The power GIS platform service 170 may provide a subject map based on power map data to the application developer.

The power infographics service 180 may provide the application developer with at least two of design item editing, inter-item link management, infographics attribute editor, template management, chart maker, map maker, table maker, data interoperation, and analysis abstraction service-related interfaces.

The UI template service 190 may provide the application developer with at least one of web compatibility, common UI, protocol support, and security support functions.

The power web HMI creation tool service 200 may provide the application developer with a web HMI creation tool.

Figure 2:
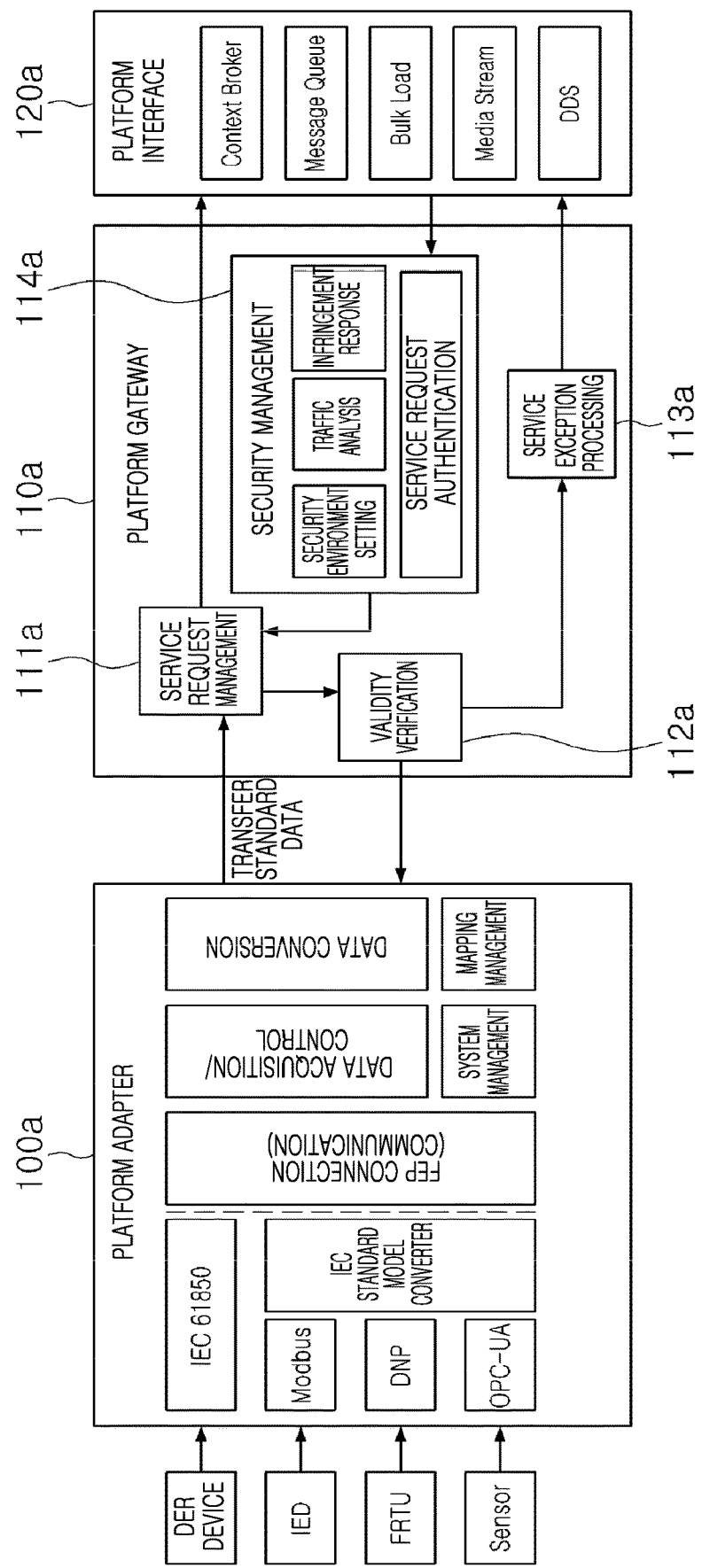
FIG. 2 is a diagram showing a platform adapter and a platform gateway of a power software development platform according to an embodiment of the present invention.

FIG. 2 is a diagram showing a platform adapter and a platform gateway of a power software development platform according to an embodiment of the present invention.

Referring to FIG. 2, a platform adapter 100*a* may support various communication protocols for connection with communication devices, such as a DER device, an IED, and an FRTU, and include a real-time processing function and conversion functions of International Electrotechnical Commission (IEC) and Next Generation Service Interface (NGSI) standard models.

For example, the platform adapter 100*a* may make it possible to integratively manage power resource data in real time through data collection from a communication device and data conversion and interoperate with various automated communication protocols, such as Modbus, distributed network protocol (DNP), and IEC61850. Also, the platform adapter 100*a* may convert the real-time data acquired from the communication device into IEC and NGSI data standard models and transfer the standardized data to a platform gateway 110*a*.

Table 1 below shows elements which may be included in the platform adapter 100*a*.

TABLE 1

| Element | Main Function |
| --- | --- |
| IEC standard model converter | Convert data of remote devices, such as Modbus and DNP, into IEC61850 data |
| FEP connection (communication) | Communicate with a data collection and conversion device (front end processor (FEP)) and process a protocol |
| Data acquisition/control | Transmit and receive real-time data and setting data of a remote device |
| Data conversion | Convert data of a remote device into context/IoT broker data |
| System management | Set environments of a remote device and provide various utility functions |
| Mapping management | Map/manage device and attributes for converting collected data of a remote device |

After verifying the data received from the platform adapter 100*a* through comparison, the platform gateway 110*a* may be connected to a platform interface 120*a* and transfer the standard data. Also, the platform gateway 110*a* may be connected to an interface using an OMA NGSI 9/10 model for the standard of bidirectional data exchange.

The platform gateway 110*a* may provide a unified path for exchanging data and control signals with power facilities, IoT sensors, platforms in and outside a company, legacy systems, external services, etc. and perform security management 114*a*, such as authentication of a service request for operation of the platform gateway 110*a*, security environment setting, harmful traffic analysis, and infringement response functions. An external system may use a context broker, an IoT broker, a message queue, a data distribution service, a bulk load, and a media stream, which are various interface middleware provided by a platform through the platform gateway 110*a*.

Table 2 below shows elements which may be included in the platform gateway 110*a*.

TABLE 2

| Elements | Main function |
| --- | --- |
| Security management 114a | Set security environments of the gateway (access right, harmful traffic analysis, service request authentication, and infringement response) Authenticate a message for a service request Analyze harmful traffic introduced into the gateway and control a connected session |
| Service request management 111a | Manage receiving of a service request from a hub to a platform adapter and interface Process routing from a platform adapter to an interface hub, and routing from the interface hub to the platform adapter Transfer a service request bound for a hub to a platform adapter and interface |

TABLE 2-continued

| Elements | Main function |
|---|---|
| Service exception processing 113a | Process service requests of IEC61850, Modbus, DNP, and open platform communications-unified architecture (OPC-UA) received by a platform adapter as exceptions<br>Process service request of a context broker, an IoT broker, a message queue, a bulk load, a media stream, and a data distribution service (DDS) received by an interface hub as exceptions |
| Service validity verification 112a | Verify validity of service requests of IEC61850, Modbus, DNP, and OPC-UA received by a platform adapter<br>Verify validity of service requests of a context broker, an IoT broker, a message queue, a bulk load, a media stream, and a DDS received by an interface hub |

The platform gateway may collect data required for application development, such as an intelligent power plant running system, a power distribution prediction system based on state inference, and a comprehensive renewable energy monitoring system, as shown in Table 3 below.

TABLE 3

| Target system | Collected data | Target system | Collected data |
|---|---|---|---|
| Meter data management system | Customer information<br>Meter information<br>Power use amount<br>Maximum load | Power generation running system | Boiler status information<br>Condenser status information<br>Combustion turbine status information<br>Power generator status information |
| Power distribution GIS | Aerial photograph of facilities<br>Photographs of facility checking<br>Photographs of facility examination<br>Photographs of completed facilities<br>Geographic information of power distribution lines | Power quality management system | Measured voltage/current values<br>Measured phase angle values<br>Measured frequency values<br>Measured active and reactive power values<br>Measured harmonic values |
| Transformer load management system | Loads on transformers | | Measured instantaneous voltage values |
| Power tunnel monitoring system | Loads on power tunnels | Power distribution automation system | Loads on power distribution lines |
| IoT platform | Sensor information | Big data platform | Power big data |

Figure 3:
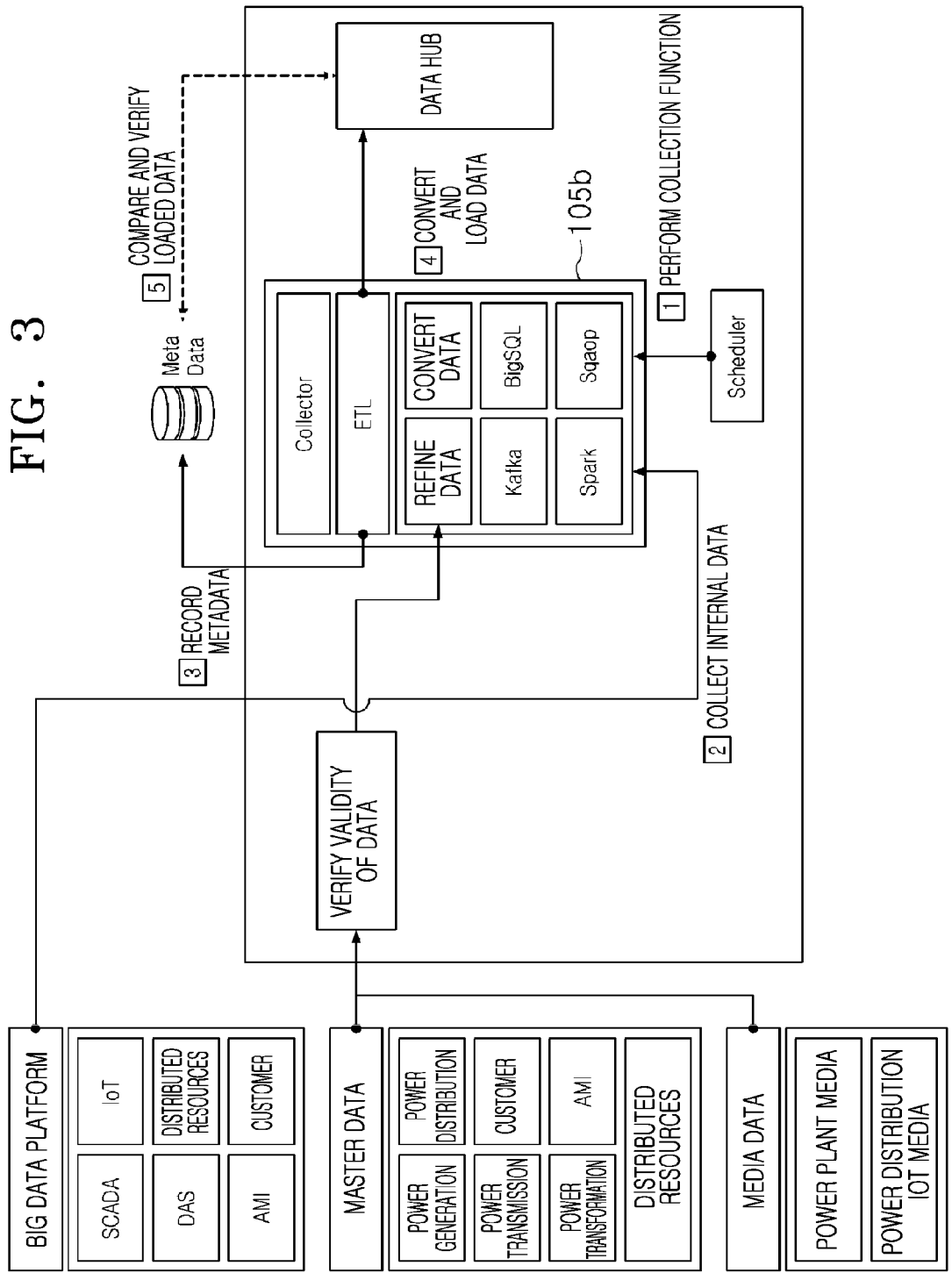
FIG. 3 is a diagram showing a data collector included in a platform gateway of a power software development platform according to an embodiment of the present invention.

FIG. 3 is a diagram showing a data collector included in a platform gateway of a power software development platform according to an embodiment of the present invention.

Referring to FIG. 3, power master data and real-time data required for developing various power applications may be collected. A data collector 105b may divide a data accumulation process into initial data accumulation and update for smooth data collection and include a pooling function to improve the capability of processing data update.

Figure 4:
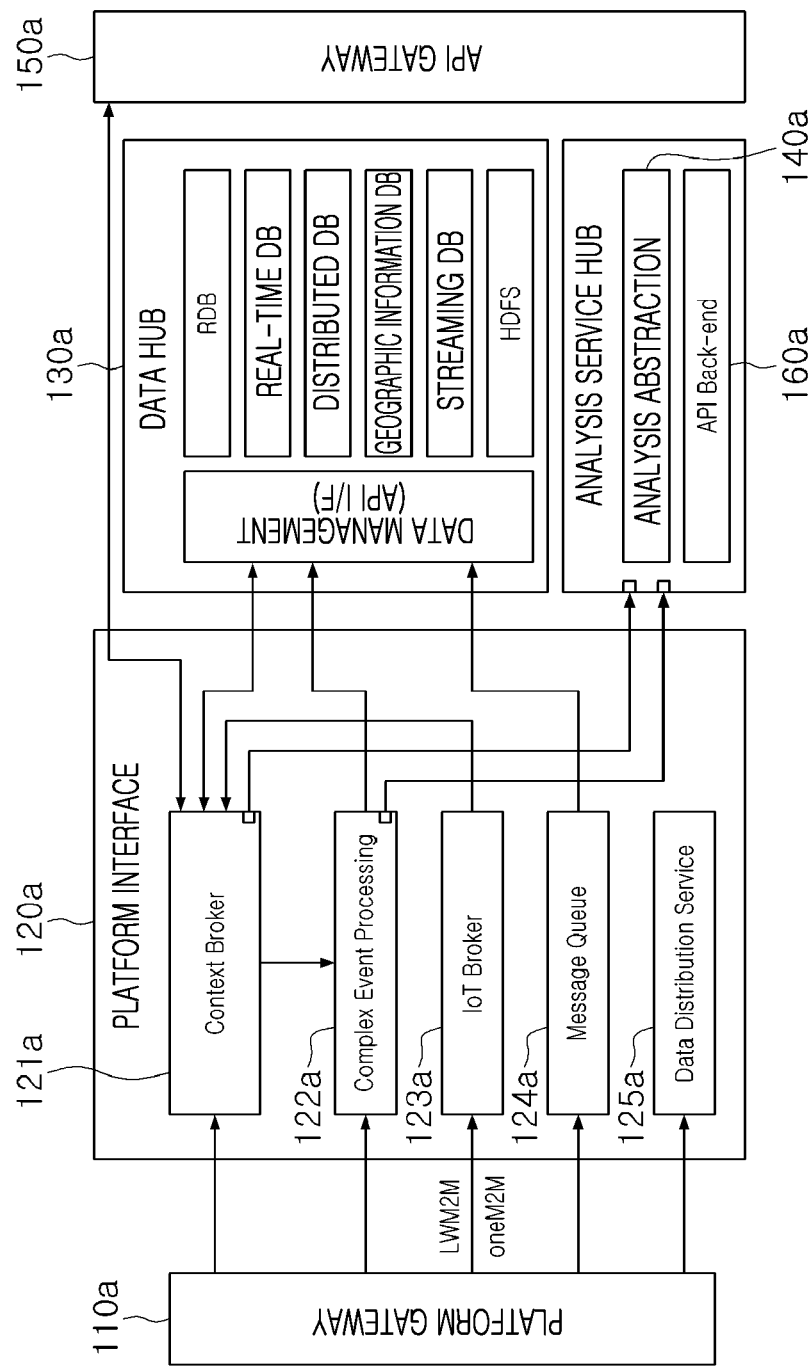
FIG. 4 is a diagram showing a platform interface of a power software development platform according to an embodiment of the present invention.

FIG. 4 is a diagram showing a platform interface of a power software development platform according to an embodiment of the present invention.

Referring to FIG. 4, the platform interface 120a may provide a distribution and subscription service by routing data or a message received from the platform gateway 110a to various interface elements, such as a context broker 121a, complex event processing 122a, an IoT broker 123a, a message queue 124a, and a data distribution service 125a, so that the data may be stored or consumed by an application. The platform interface 120a may apply OMA NGSI 9/10 as an interface standard.

Object modeling management may manage object information, a hierarchical structure, and templates on the basis of the NGSI 9/10 standard and provide query management for object modeling management, graph expression language (GEL) query management, and an application required for object modeling management.

The context broker 121a may include context registration, search, query, and update functions and provide a function of connecting to a platform gateway, an interface, a data hub, and a service on the basis of NGSI.

The IoT broker 123a may include context broker interface (I/F), resource management, IoT discovery, and IoT agent functions as shown in Table 4 below.

TABLE 4

| Elements | Main function |
| --- | --- |
| Context broker I/F | Provide functions related to a context broker based on NGSI 9/10 |
| Resource management | Manage and map resources managed by an IoT platform on the basis of entities and attributes based on a context broker |
| IoT discovery | Provide various interfaces, which are provided by an IoT broker including IoT device discovery, in the form of a rest-based API |
| IoT Agent | Provide functions related to various IoT platforms<br>Connect to one machine-to-machine (oneM2M) and lightweight machine-to-machine (LWM2M) standards |

The complex event processing 122a may include rule and pattern registration, event source I/F, and rule sensing and processing functions as shown in Table 5 below.

TABLE 5

| Elements | Main function |
| --- | --- |
| Rule and pattern registration | Register rules and patterns for sensing a derived event from event sources |
| Event source I/F | Use an NGSI standard I/F for registering event sources and derived event results |
| Rule monitoring and processing | Sense rules and patterns by analyzing event sources in real time and generate a derived event |

The platform data hub 130b which performs the data management/verification may verify suitability errors of the collected data, report detected errors, process suitability of an entity through a verification log, manage whether to collect main items for data collection, and proceed with verification by designating verification items.

Figure 16:
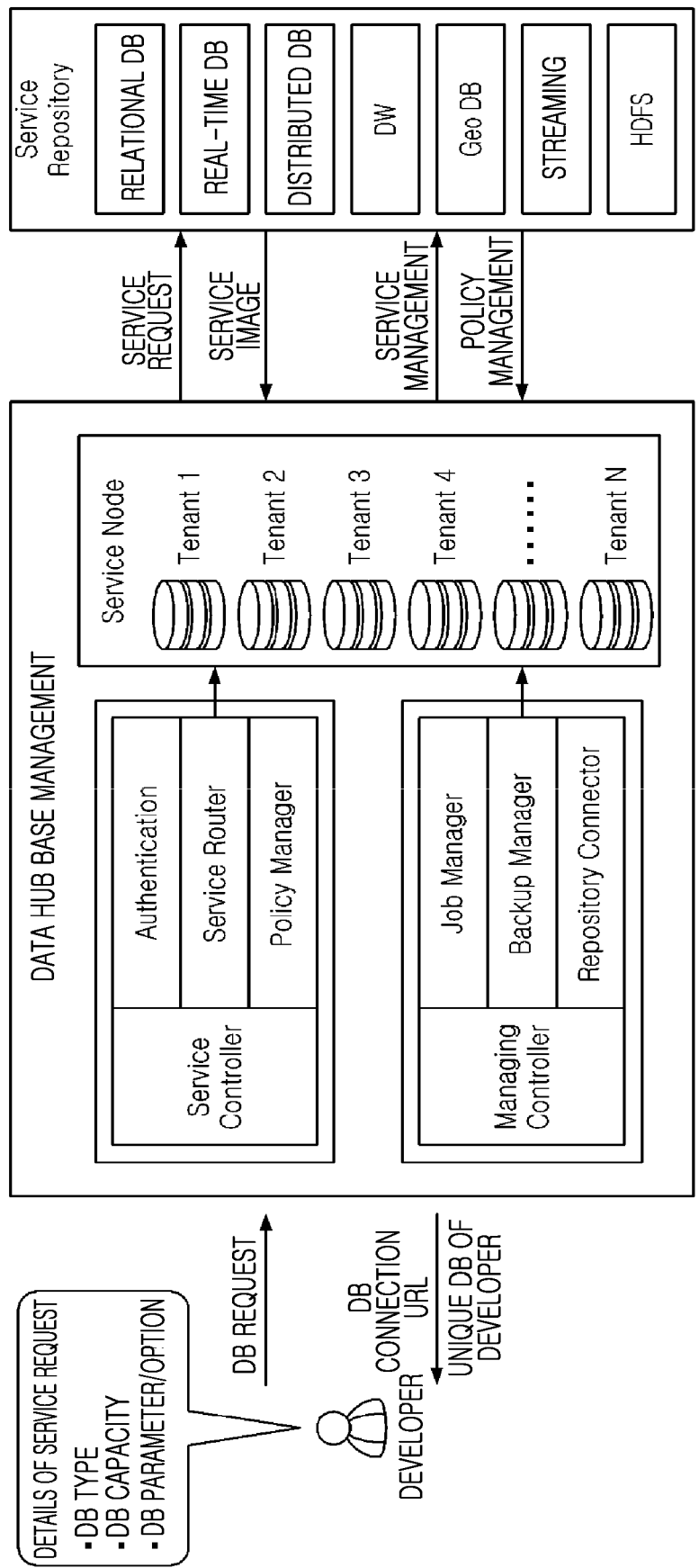
FIG. 16 is a diagram showing an example of policy management and authentication management of a platform data hub of a power software development platform according to an embodiment of the present invention.

Also, the platform data hub 130b may perform generation, policy management, and authentication management for a database (DB) service which requires an application developer as shown in FIG. 16, provide DBs which are separated according to tenants so as to provide a stable DB service, and provide a DB service for backups, snapshots, and the like.

Table 6 below shows elements which may be included in the platform data hub 130b.

TABLE 6

| Element | Main function |
| --- | --- |
| Service controller | Take charge of tenant-specific service generation and processing on the basis of requests of a developer from the service repository<br>Authenticate users and process service routing<br>Manage policies and parameters of service nodes separately allocated to users |
| Managing controller | Manage and back up jobs of the service controller and the service node |
| Service node | Manage DBs generated according to tenants |
| Service repository | A repository of original images (a virtual machine, a container, etc.) of DBs |

Figure 5:
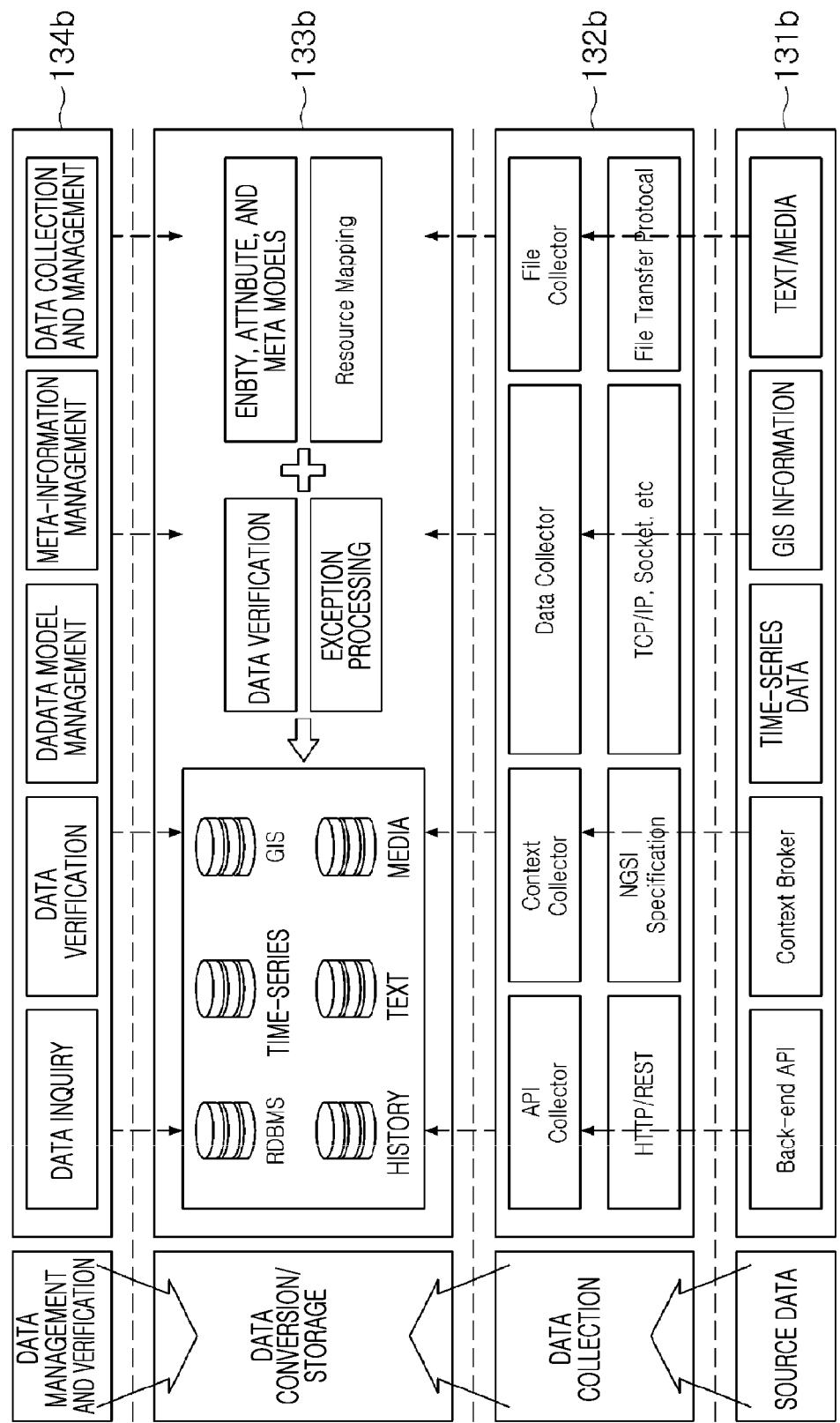
FIG. 5 is a diagram showing a platform data hub of a power software development platform according to an embodiment of the present invention.

FIG. 5 is a diagram showing a platform data hub of a power software development platform according to an embodiment of the present invention.

Referring to FIG. 5, a platform data hub 130b may collect source data 131b from various data sources, convert the source data into data models, such as entity, attribute, and meta, and perform inquiry and verification functions on stored data. In other words, the platform data hub 130b may include functions of data collection 132b, data conversion/storage 133b, and data management/verification 134b.

The platform data hub 130b which performs the data collection 132b may collect data conforming to a platform standard, such as JavaScript object notation (JSON) and NGSI, and convert various kinds of structured and unstructured data.

Figure 15:
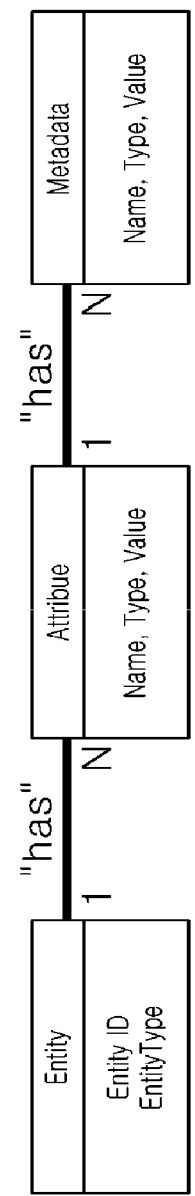
FIG. 15 is a diagram showing an example of a data conversion model of a platform data hub of a power software development platform according to an embodiment of the present invention.

The platform data hub 130b which performs the data conversion/storage 133b may convert data into a model shown in FIG. 15 according to predefined modeling rules and store the converted data.

Figure 6:
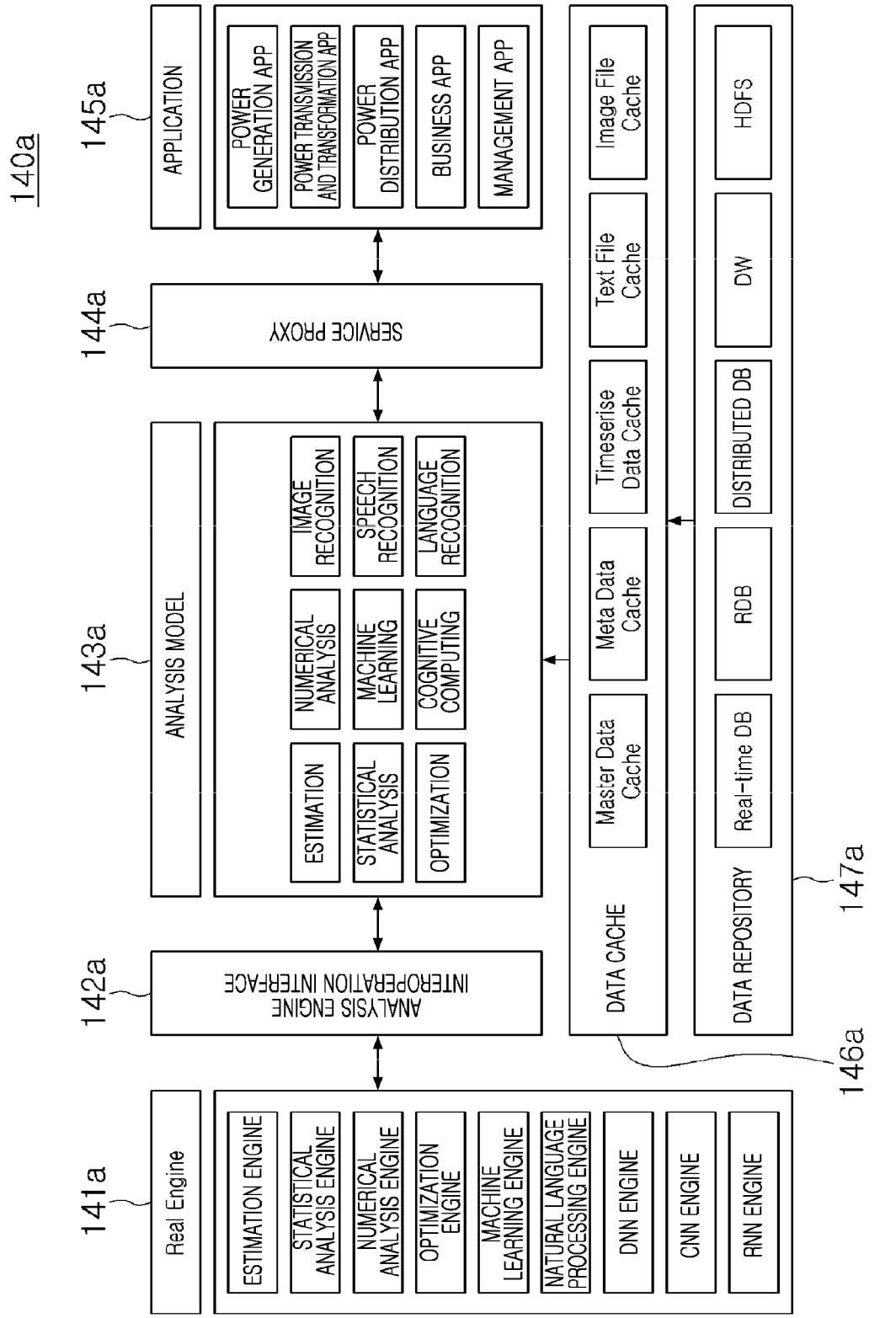
FIG. 6 is a diagram showing an analysis abstraction service of a power software development platform according to an embodiment of the present invention.

FIG. 6 is a diagram showing an analysis abstraction service of a power software development platform according to an embodiment of the present invention.

Referring to FIG. 6, an analysis abstraction service 140a may convert various physical analysis engines, which are used by analysis platforms, such as big data and an artificial intelligence, into abstracted service forms and provide the abstracted services to an application 145a.

The analysis abstraction service 140a may provide a function of minimizing dependency between an application and an analysis engine by abstracting and providing various analysis functions such as estimation, statistical analysis, optimization, numerical analysis, machine learning, cognitive computing, image recognition, speech recognition, and language recognition, which are required to develop applications for power generation, power transmission and transformation, power distribution, etc., through a service proxy 144a.

When developers develop applications using an analysis model 143a of an abstraction stage, no effort is required to install analysis engines and set environments thereof. Therefore, it is possible to shorten a development time period.

A real engine 141a may be configured as an open source element or a commercial element. An analysis engine inter-operation interface 142a layer may connect the real engine 141a and the analysis model 143a.

Data used for analysis may be stored in a data repository 147a which may include a real-time DB, a relational DB (RDB), a distributed DB, a data warehouse (DW), a HaDoop file system (HDFS), etc. of a data repository. A data cache 146a may be provided to increase analysis speed and provide convenience of data access. The data cache 146a may include a master data cache, a metadata cache, a time-series data cache, a text file cache, an image file cache, and the like.

Table 7 below shows elements which may be included in the analysis abstraction service 140a.

TABLE 7

| Element | Main function |
| --- | --- |
| Service proxy | Service proxy of an abstraction level for access to functions of an analysis computing model provided by a platform<br>Provide connection to numerical analysis, image recognition, statistical analysis, machine learning, speech recognition, optimization, cognitive computing, and language recognition computing model services |
| Analysis engine interoperation interface | An API interface which enables access to an analysis tool by mapping functions provided by the analysis tool<br>Provide an access method to a library provided by the analysis tool<br>An interface for estimation, statistical analysis, numerical analysis, optimization, machine learning, natural language processing, and deep learning analysis engines |
| Analysis engine | A layer which actually executes an analysis engine |
| Analysis platform utility layer | A utility which performs management, such as authentication, logging, data caching, and monitoring, for an analysis platform<br>Include master data, metadata, time-series data, text files, image files, and speech file cache management for running analysis computing model |

Figure 7:
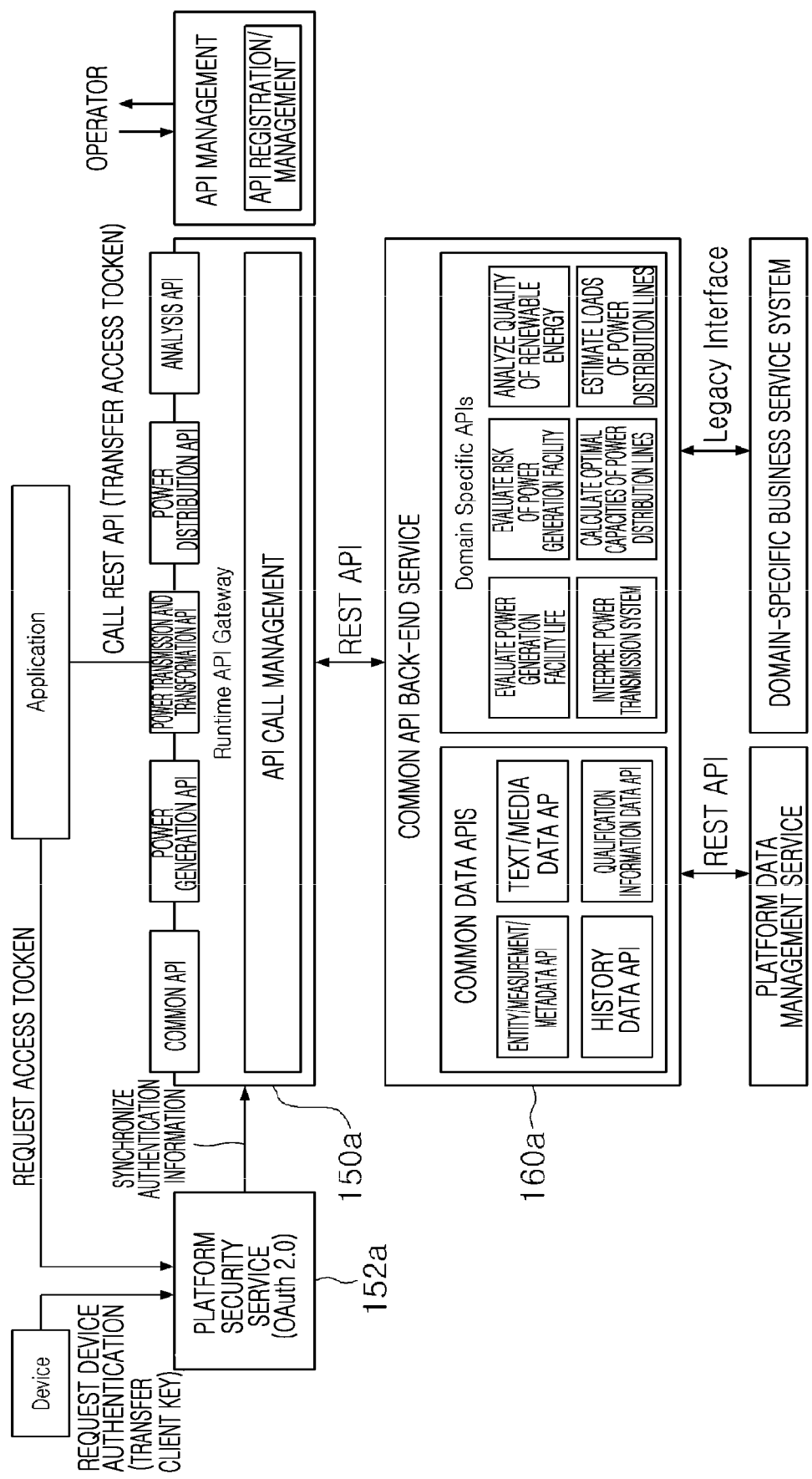
FIG. 7 is a diagram showing an application gateway and an application back-end service of a power software development platform according to an embodiment of the present invention.

FIG. 7 is a diagram showing an application gateway and an application back-end service of power software development platform according to an embodiment of the present invention.

Referring to FIG. 7, an application gateway 150a may exchange applications with an application back-end service 160a and include a function of controlling application access through a platform security service 152a.

Figure 8:
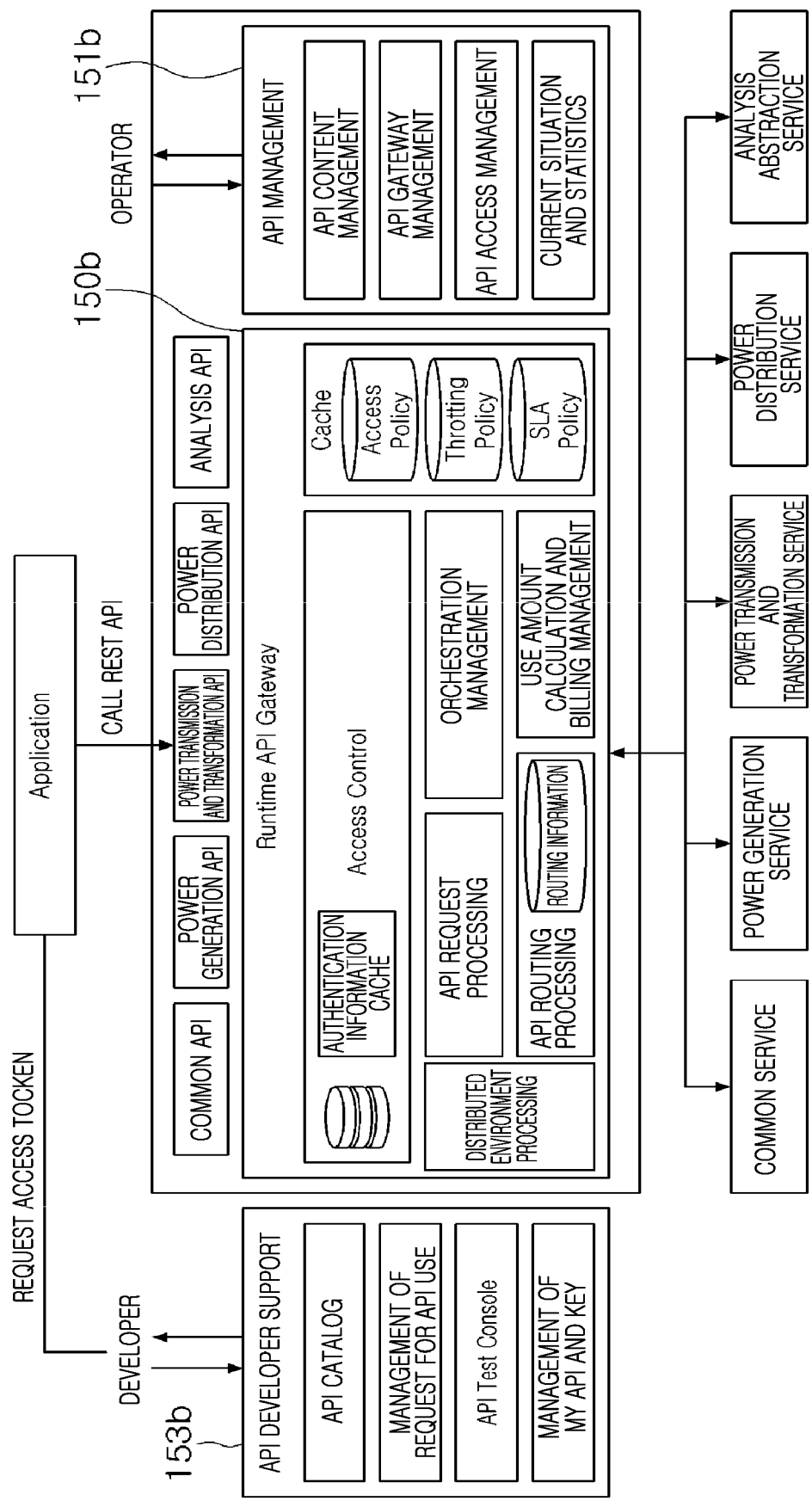
FIG. 8 is a diagram showing an application gateway of a power software development platform according to an embodiment of the present invention.

FIG. 8 is a diagram showing an application gateway of a power software development platform according to an embodiment of the present invention.

Referring to FIG. 8, an application gateway 150b may include a cache technique for policy data and authentication data for obtaining rapid response performance. The application gateway 150b may have a distributed environment processing function for scale-out-based system expansion and stability assurance and an application access control function for managing only an approved application.

An application developer may be supported by an application developer support service 153b, and an administrator may run the application gateway 150b through an application management service 151b.

Table 8 below shows elements which may be included in the application gateway 150b.

TABLE 8

| | Elements | Main function |
| --- | --- | --- |
| Runtime API gateway | Access control | Provide a function of checking whether each application has a right to use an API call |
| | API request processing | Verify validity of called data and process throttling and service level access (SLA) |
| | API routing processing | Transfer request information to a service which is a target of a called API |
| | Distributed environment processing | Manage a chache for supporting a distributed environment, manage a call count, and process calculation |
| | Orchestration management | Provide a function of managing and processing orchestration based on business modeling |
| | Use amount calculation and billing | Process API traffic logging and calculate a use amount according to a billing policy |
| API management | API content management | Introduce an API in the form of a catalog and provide a guide for API use, a manual, and a sample |
| | API gateway management | Manage various policy (throttling, SLA, etc.) information processed by an API gateway |
| | API access management | Manage information on applications and users who use an API and manage access key or token information |
| | Current API situation and statistics | Provide current API usage status and various user- or application-specific usage statistics |

Figure 9:
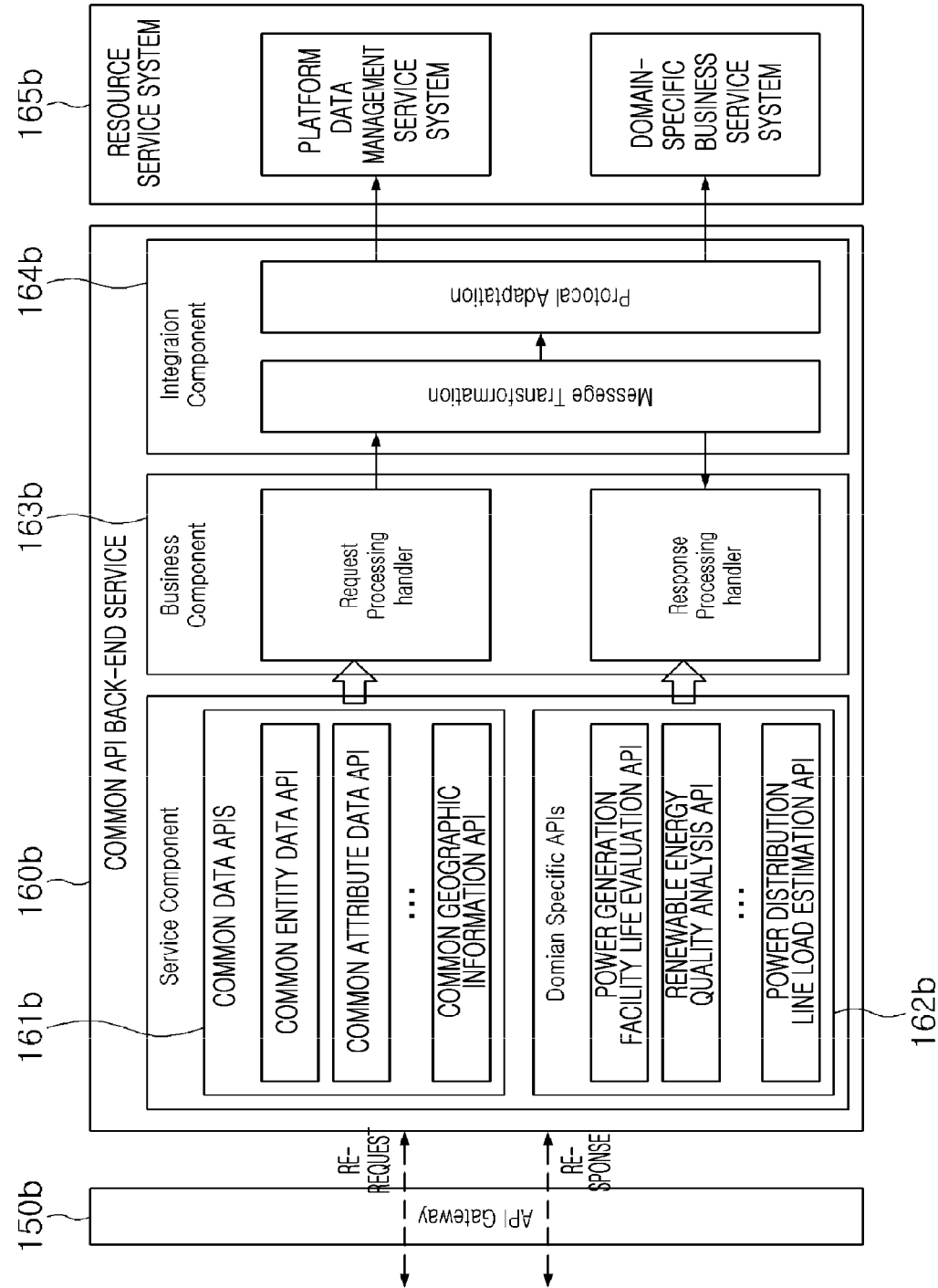
FIG. 9 is a diagram showing an application back-end service of a power software development platform according to an embodiment of the present invention.

FIG. 9 is a diagram showing an application back-end service of a power software development platform according to an embodiment of the present invention.

Referring to FIG. 9, an application back-end service 160b may separate layer-specific roles and responsibilities on the basis of a layered architecture. In other words, the application back-end service 160b may improve stability and scalability by ensuring a structure in which layers are independent from each other.

The application back-end service 160b may include elements as shown in Table 9 below.

TABLE 9

| Element | Main function |
| --- | --- |
| Service component | A component which provides a back-end API service exposed through an API gateway<br>Provide service APIs which may access a back-end service provided by a platform<br>Common data APIs: entity, attribute, meta, history, text, media, and geographic information APIs<br>Domain-specific APIs<br>A service component calls a business component to conduct various processes |
| Business component 163b | Process a request (create, read, update, and delete (CRUD)) and a response of an API called through a service component<br>Connect to an integration component |
| Integration component 164b | Perform functions associated with a platform data management service system, which is a resource service system, and a domain-specific business service system<br>Map data to be stored in a related system and inquired results to a value object to which a data access object (DAO) pattern is applied |
| Resource service system 165b | Associate a common API back-end service with a domain corresponding to a platform data management system, which manages data, through the integration component<br>Entity, attribute, meta, history, text, media, geographic information, and the like<br>Associate a common API back-end service with a business system domain, such as power generation, power transmission and transformation, and power distribution, through the integration component |

Applications managed by the application back-end service 160b may be classified into a common application service 161b and a domain-specific application service 162b. The common application service 161b denotes a set of applications, such as an interface, a data hub, analysis, visualization, and data linkage provided by a platform, which are not specialized in domains and may be used in common. The domain-specific application service 162b denotes a set of applications, such as power generation, power transmission and transformation, and power distribution, which may be reused in a specific domain, and may include application services as shown in Table 10 below.

TABLE 10

| Domain | API service | Content |
| --- | --- | --- |
| Power generation | Evaluating the life of a power generation facility | Evaluate the life of a power generation facility by analyzing specifications, an operation history, etc. thereof |
| | Evaluating a risk of a power generation facility | Evaluate a risk of a power generation facility by analyzing a temperature, a load, images, etc. thereof |
| | Analyzing a correlation with a cause of a trouble | Determine a cause of a trouble by analyzing various kinds of data such as specifications, an operation history, and sensing information of a power generation facility |
| Power transmission and transformation | Renewable energy quality analysis | Analyze quality of renewable energy by analyzing a voltage, a current, a frequency, active and reactive powers, etc. of a renewable energy output |
| | System interpretation | Interpret quality of a system by analyzing a voltage, a current, a frequency, active/reactive powers, a harmonic, etc. of a substation output |
| | Estimating the amount of power generation from renewable energy | Estimate power generation amounts of various renewable energy plants such as sunlight, solar heat, wind power, fuel cell, hydrogen, bio, wastes, terrestrial heat, waterpower, and water heat |

TABLE 10-continued

| Domain | API service | Content |
|---|---|---|
| Power distribution | Determining a risky spot in a facility based on images | Determine whether the corresponding facility is risky by analyzing thermographic images taken from sites of power distribution lines |
| | Calculating optimal capacities of lines and transformers | Calculate optimal capacities of lines and transformers by analyzing specifications, loads, and environmental elements of each line |
| | Estimating loads of power distribution lines | Estimate loads of power distribution lines by analyzing correlations between external factors, which affect a load of each power distribution line, and loads |

Figure 10:
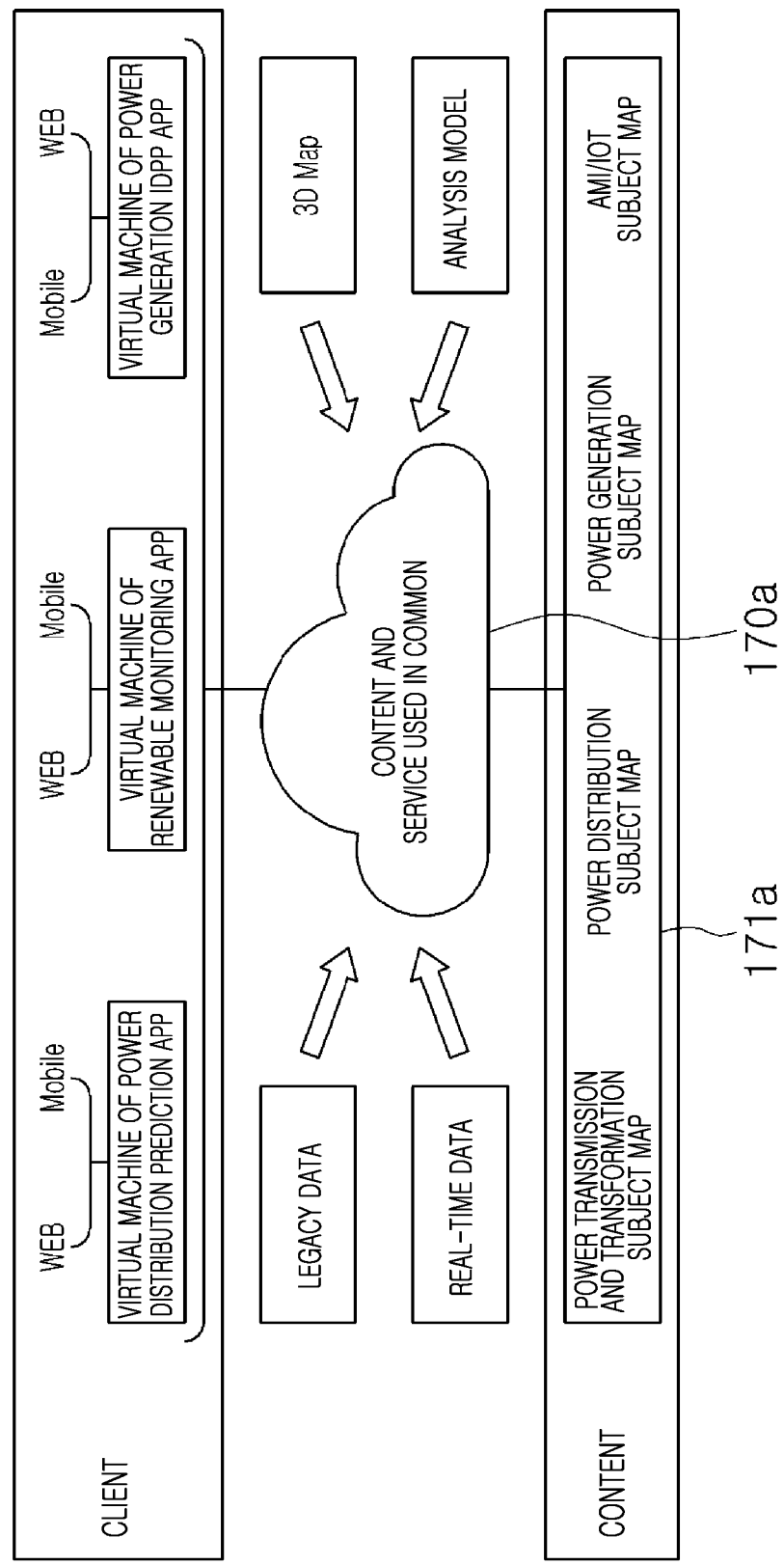
FIG. 10 is a conceptual diagram showing a power geographic information system (GIS) platform service of a power software development platform according to an embodiment of the present invention.

FIG. 10 is a conceptual diagram showing a power GIS platform service of a power software development platform according to an embodiment of the present invention.

Referring to FIG. 10, a power GIS platform service 170a may include a cloud service to share and manage various types of power map data required for power application development. The power GIS platform service 170a may integrate a general map with GIS information of a power transmission and transformation GIS and a power distribution GIS, which are related to electric power, into a web GIS platform. The web GIS platform includes legacy data, real-time data, an analysis model, and a three-dimensional (3D) map. Application developers for power generation, power transmission and transformation, power distribution, etc. may easily implement a GIS visualization module on the basis of a web GIS platform service.

Also, the power GIS platform service 170a may provide subject map content 171a including a power transmission and transformation subject map, a power distribution subject map, a power generation subject map, and an advanced metering infrastructure (AMI) or IoT subject map.

Figure 11:
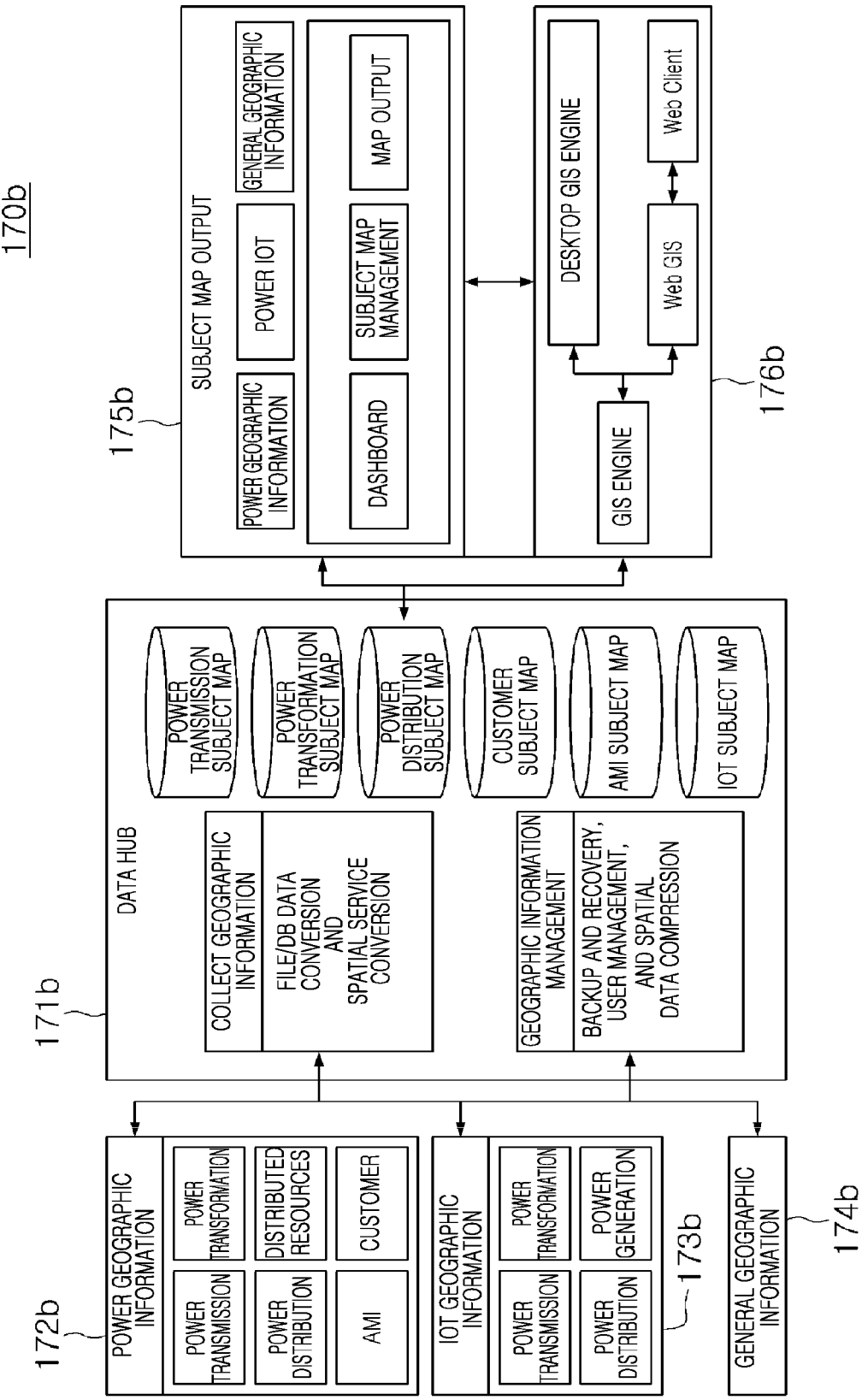
FIG. 11 is a diagram showing a power GIS platform service of a power software development platform according to an embodiment of the present invention.

FIG. 11 is a diagram showing a power GIS platform service of a power software development platform according to an embodiment of the present invention.

Referring to FIG. 11, a power GIS platform service 170b may provide a function of outputting 175b a subject map of power geographic information 172b, a subject map of IoT geographic information 173b, and a subject map of general geographic information 174b. The power GIS platform service 170b may support user-oriented system building by providing a tool which conveniently functions to easily output a subject map, and an Open Geospatial Consortium (OGC) standard GIS technique 176b may be applied to improve interoperability of a location-based visualization service.

The power GIS platform service 170b implements subject map control and output using an R+ tree and a map data structure, which show optimal performance upon processing spatial data, and may include subject map control, subject map output speed improvement, and subject map output functions as shown in Table 11.

TABLE 11

| Element | Main function |
|---|---|
| Subject map control | Move a map screen according to a user's mouse input<br>Move a map screen according to coordinates<br>Enlarge or reduce a map by zooming in, zooming out, zooming extend, or the like<br>Automatically display a scale bar according to a map scale |

TABLE 11-continued

| Element | Main function |
|---|---|
| | Display an index map which is immediately movable<br>Turn on or off each facility layer |
| Subject map output speed improvement | Transmit only data of a required domain using an R+ tree data structure<br>Cache a tile map through a map data structure<br>Process a tile map to have the same size in all scales by applying level of detail (LOD)<br>Use hypertext markup language (HTML)5 canvas Progressive rendering |
| Subject map output | Support subject maps, charts, labeling, and output forms, and function for Excel, portable document format (PDF), etc. reporting |

The power GIS platform service 170b may collect and convert various kinds of distributed geographic information and store the converted geographic information in a geo DB of a platform data hub. The geo DB may store power transmission, power transformation, power distribution, distributed power, consumers, AMI, IoT, and general geographic information subject maps and include geographic information collection and management functions such as data or spatial service conversion and spatial data compression.

Figure 12:
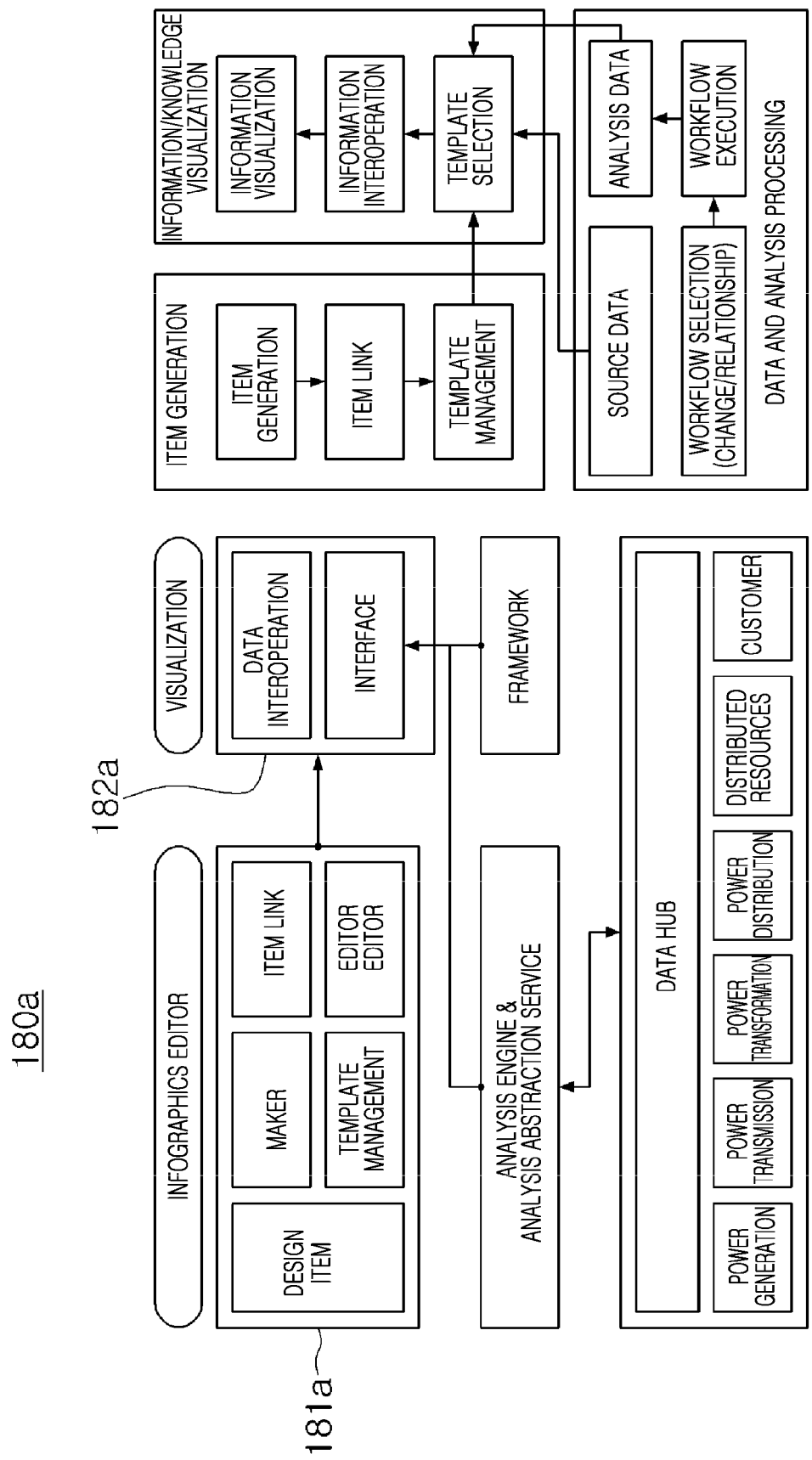
FIG. 12 is a diagram showing a power infographics service of a power software development platform according to an embodiment of the present invention.

FIG. 12 is a diagram showing a power infographics service of a power software development platform according to an embodiment of the present invention.

Referring to FIG. 12, a power infographics service 180a may readily and rapidly deliver power information, data, and knowledge through graphic-based visual expressions and include a visualization environment which is flexible and user-intuitive by connecting infographics items and data analysis results.

The power infographics service 180a may include elements as shown in Table 12 below.

TABLE 12

| Domain | API service | Content |
|---|---|---|
| Info-graphics editor 181a | Design item | Generally refer to insertable/editable design elements such as icons, pictures, and figures<br>Edit by freely adjusting color and size |
| | Inter-item link | Configure infographics through links between design items<br>Manage links between power generation, power transmission, power transformation, power distribution, distributed resource, and consumer items |
| | Editor editor | A menu bar having a function of adjusting attributes of design elements<br>Can change attributes such as size, |

TABLE 12-continued

| Domain | API service | Content |
|---|---|---|
| | Template management | transparency, font, color, inversion, and link Change, modify, and combine graph elements into a prepared design form Manage image templates of power generation, power transmission, power transformation, power distribution, distributed resource, and consumer |
| | Chart maker | Provide data visualization with various charts when only data is input Readily input data through the Excel I/F (support input methods such as data receiving) |
| | Map maker | Create a map based on location data by only clicks and simple inputs Readily input data through the Excel I/F and support various detailed maps |
| | Table maker | Rapidly and readily create a table of design by inputting only text Set the number of rows and columns, fonts, sizes, colors, line colors, alignments, etc. in an overall table Set a font, a background color, and an alignment of each row and column |
| Infographics visualization 182a | Data interoperation Interface | Interoperate infographics items and templates with source and analysis data Provide an analysis abstraction service and framework and an interface |

Figure 13:
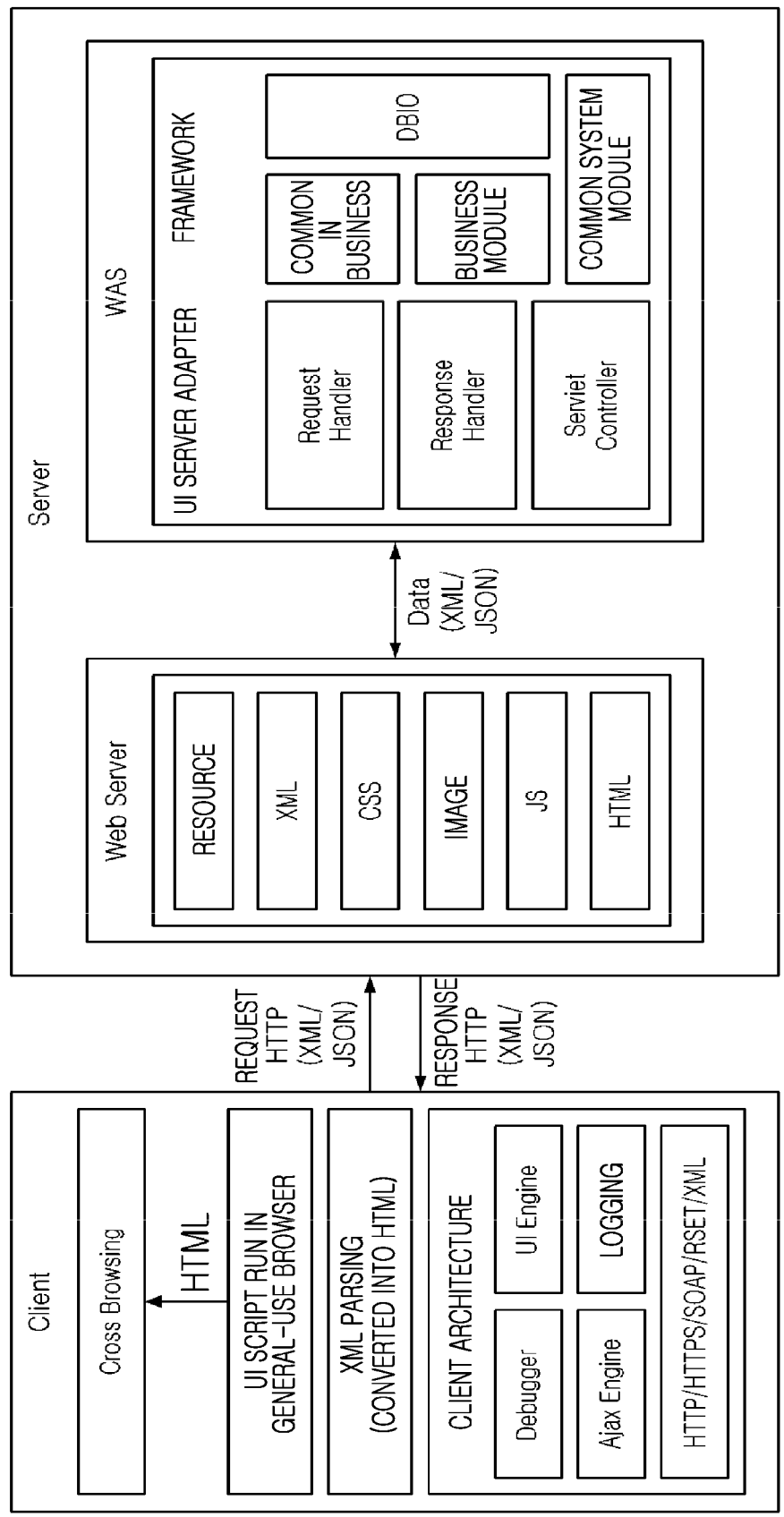
FIG. 13 is a diagram showing a power user interface (UI) template service of a power software development platform according to an embodiment of the present invention.

FIG. 13 is a diagram showing a power UI template service of a power software development platform according to an embodiment of the present invention.

Referring to FIG. 13, a power UI template service 190a may include a UI template service capable of complying with web standards, web compatibility, and web accessibility. The power UI template service 190a may maximize development productivity by providing various communication protocols and UI components and include a function of applying characteristics of a software development work to development and operation environments.

The power UI template service 190a may include elements as shown in Table 13 below.

TABLE 13

| | Elements | Main function |
|---|---|---|
| Web compatibility | Web standard support | Ensure web browser and platform independence by applying a web standard technology |
| | Non active-X | Maximize user convenience with a no-download environment (support Ajax) |
| | Multi OS and browser | Support various operating systems (OSs; Window, Mac OS iOS, Linux, Android, etc.) and various browsers (Internet explorer (IE), Firefox, Chrome, Opera, Safari, etc.) |
| Common UI function | Support UI components | Components of a reuse structure such as tree and list views, page tabs, grids, and charts |
| | Support MDI components | Provide master data integration (MDI) components (in a grid, staircase, horizontal, or vertical arrangement) which operate according to a web standard |
| | Support grid functions | Drag and drop, drill down, cell merging, dynamic filtering, frame fixing, interoperation with Excel, sort, etc. |
| Protocol support | HTTP/HTTPS | Support the hypertext transfer protocol (HTTP), which is a standard web communication protocol, and the secure sockets layer (SSL) for secure communication |
| | SOAP/REST | Support the web service definition language (WSDL) and the simple object access protocol (SOAP) for web service and support representational state transfer (REST) for open API usage |
| | JSON interoperation/JSONP | Support POST method communication for interoperation with JSON and support JSON with padding (JSONP) which is a web standard |
| Security support | User right management | Enhance security by managing rights depending on users (manager, general user, etc.) |
| | Source security | Prevent source view, limit mouse clicks, limit logging, and make source reading difficult |
| | Virtual keyboard connection | Ensure confidentiality of personal information by connection to keyboard security solution based on a web standard technique |

Figure 14:
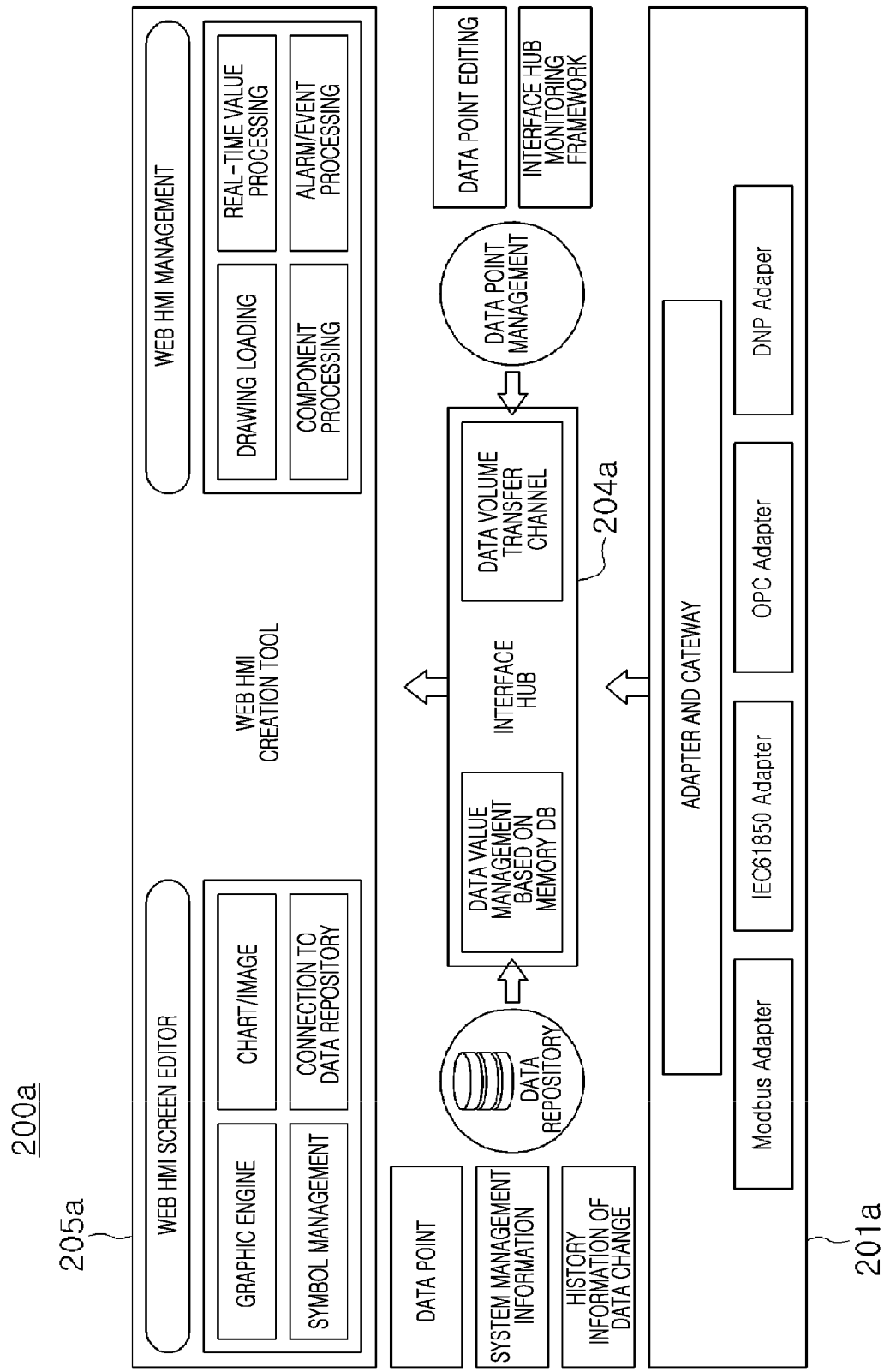
FIG. 14 is a diagram showing a power web human-machine interface (HMI) creation tool service of a power software development platform according to an embodiment of the present invention.

FIG. 14 is a diagram showing a power web HMI creation tool service of a power software development platform according to an embodiment of the present invention.

Referring to FIG. 14, a power web HMI creation tool service 200a may support implementation of a power system-based application through collected data mapping of a graphic-based power facility icon editor and a remote device adapter and rapidly visualize data collected from power facilities and the IoT in an HMI without software coding. An HMI graphic editor tool may provide various power facility icons required for a power HMI configuration and edit configurations and attributes of the icons. The power web HMI creation tool service 200a includes a function of setting a message broker and a data pointer so as to provide data of external facilities required to run an HMI.

The power web HMI creation tool service 200a may include elements as shown Table 14 below.

TABLE 14

| | Elements | Main function |
|---|---|---|
| Web HMI creation tool 205a | Web HMI screen editor | A web HMI screen development tool without coding in the form of a document editor |
| | Web HMI management | Support operation of an HMI screen made in an editor and HMI communication with an interface hub |
| Interface hub 204a | Memory DB | Support data access using a shared memory of received facility data and the structured query language (SQL) |
| | Message channel | Distribute data for transferring real-time measured values of a remote device to a web HMI Middleware (use a context broker) |
| | Data point management | Manage points of measured values distributed through middleware (a context broker) |
| Adapter and gateway 201a | Gateway | Transfer real-time measured values received from an adapter to the interface hub |
| | Adapter | Support various communication protocols (Modbus, IEC61850, OPC-UA, DNP, etc.) for communication with a remote device |

Meanwhile, a power software development platform according to an embodiment of the present invention may be implemented as a computing environment (e.g., a personal computer, a server computer, a handheld or laptop device, a mobile device (a mobile phone, a personal digital assistant (PDA), a media player, etc.), a multiprocessor system, a consumer electronic device, a mini computer, a mainframe computer, a distributed computing environment including any aforementioned system or device, etc.).

The computing environment may include a processor (e.g., a central processing unit (CPU), a graphics processing unit (GPU), a microprocessor, an application-specific integrated circuit (ASIC), field programmable gate arrays (FPGA), etc.), a memory (e.g., a volatile memory (e.g., a random access memory (RAM)), a non-volatile memory (e.g., a read only memory (ROM) and a flash memory), a magnetic storage, an optical storage, etc.), an input device (e.g., a keyboard, a mouse, a pen, a voice input device, a touch input device, and an infrared camera), an output device (e.g., a display device, a speaker, and a printer), and a communication connection (e.g., connection through a modem, a network interface card (NIC), an integrated network interface, a radio frequency transmitter and receiver, an infrared port, and a universal serial bus (USB)), but the computing environment is not limited thereto.

Meanwhile, the term "unit" used in this embodiment refers to a hardware element such as an FPGA or an ASIC, and a "unit" executes certain roles. However, a "unit" is not limited to software or hardware. A "unit" may be configured to reside in an addressable storage medium or configured to execute one or more processors. Therefore, a "unit" may include, for example, elements such as software elements, object-oriented software elements, class elements, and task elements, processes, functions, attributes, procedures, subroutines, segments of a program code, drivers, firmware, microcode, circuitry, data, DBs, data structures, tables, arrays, and variables. Functions provided in elements and "units" may be combined into fewer elements and "units" or subdivided into additional elements and "units." In addition, elements and "units" may be implemented to execute one or more CPUs in a device or a system.

Thus far, the present invention has been described with reference to embodiments, but the present invention is not limited to the embodiments. Those of ordinary skill in the art to which the present invention pertains can make various changes and modifications without departing from the gist of the present invention disclosed in the following claims.

The invention claimed is:

1. A power software development platform comprising:
   a platform adapter configured to provide a connection environment for a plurality of communication devices each installed in a plurality of power facilities;
   a platform gateway configured to collect data through a plurality of power systems to which the plurality of communication devices is connected;
   a platform interface configured to provide a distribution service for the data collected by the platform gateway;
   a platform data hub configured to receive the data through the distribution service, verify the received data, and provide an access environment for the verified data to an application developer;
   an analysis abstraction service configured to convert a plurality of physical analysis engines into abstracted services and provide the abstracted services to the application developer;
   an application gateway configured to receive an application from the application developer and provide the application to an application user; and
   an application back-end service configured to provide an administrator with a management environment for the application provided by the application developer and transfer the application managed in the management environment to the application gateway at a request of the application user wherein the application back-end service further provides a validation environment and a standardization environment for the application provided by the application developer;
   wherein the standardization environment is an interface standard, an open mobile alliance Next Generation Service Interfaces (OMA NGSI) 9/10.

2. The power software development platform of claim 1, wherein the platform gateway performs security management and validity verification of the collected data.

3. The power software development platform of claim 1, wherein the analysis abstraction service provides the application developer with a service in which at least two of an estimation model, a statistical analysis model, a numerical analysis model, an optimization model, a machine learning model, a cognitive computing model, an image recognition model, a speech recognition model, and a language recognition model are abstracted.

4. The power software development platform of claim 1, further comprising a geographic information system (GIS) platform service configured to provide a subject map based on power map data to the application developer.

5. The power software development platform of claim 1, further comprising a power infographics service configured to provide the application developer with at least two of design item editing, template management, chart maker, table maker, and analysis abstraction service-related interfaces.

6. The power software development platform of claim 1, further comprising a power user interface (UI) template service configured to provide the application developer with at least one of web compatibility, common UI, protocol support, and security support functions.

7. The power software development platform of claim 1, further comprising a web human-machine interface (HMI) creation tool service configured to provide a web HMI creation tool to the application developer.

* * * * *